March 5, 1968
R. W. HATCH, JR
3,371,675
FLUID AMPLIFIER
Filed June 24, 1964
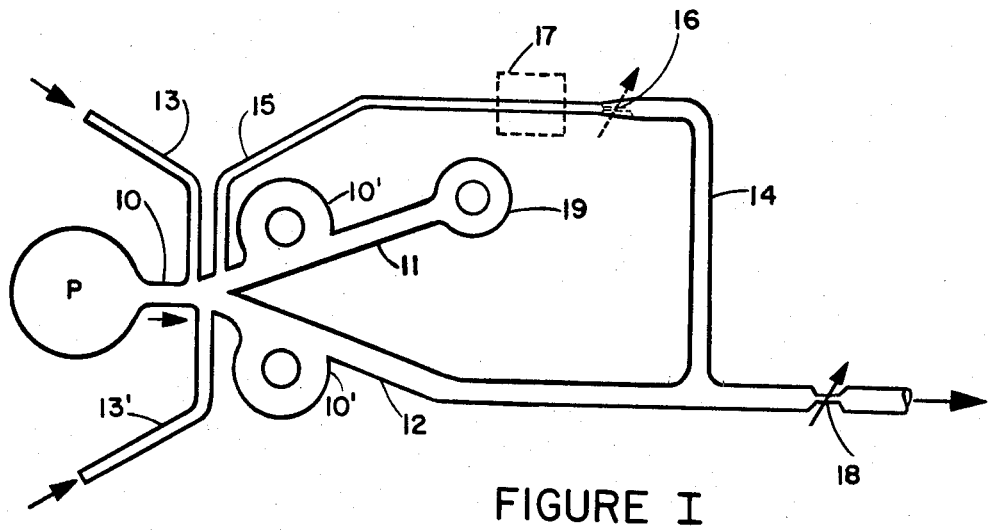
FIGURE I
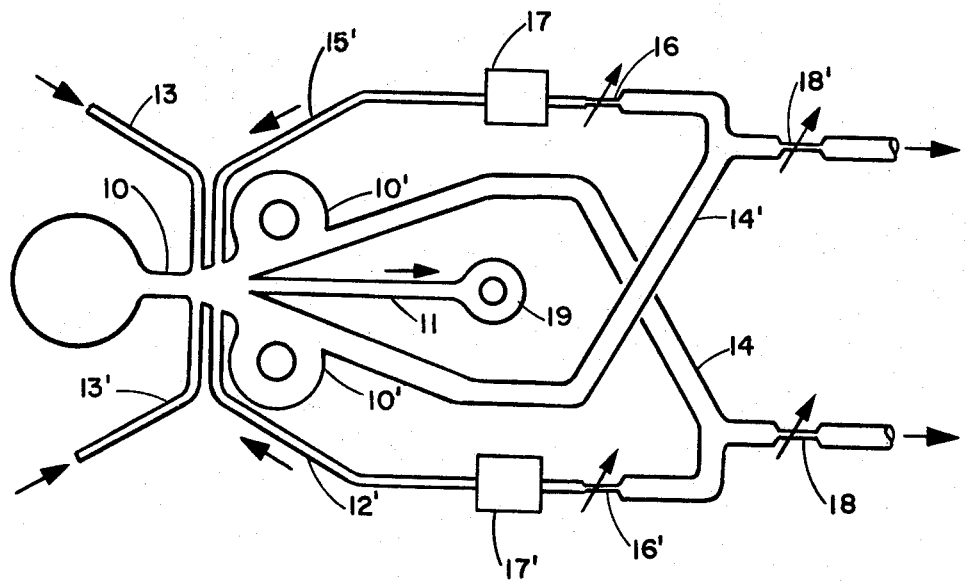
FIGURE II
INVENTOR.
RICHARD W. HATCH, JR.
BY
Lawrence H. Patton
AGENT

United States Patent Office 3,371,675
Patented Mar. 5, 1968

3,371,675
FLUID AMPLIFIER
Richard W. Hatch, Jr., Norwell, Mass., assignor to The Foxboro Company, Foxboro, Mass., a corporation of Massachusetts
Filed June 24, 1964, Ser. No. 377,647
1 Claim. (Cl. 137—81.5)

This invention provides dynamic fluid amplifier continuous flow devices and has particular reference to analog devices operating on a proportioning basis.

This device provides means for proportionally diverting a main flow and also provides a positive feedback control from this diverted flow to maintain and lock up a particular value of diverted flow, when the initial control signal is removed.

This same device may be provided with integral (reset) action by including a resistance capacity combination in the feedback so that the feedback is a rate function resulting in a control reset action. This device is thus provided with a memory of a proportioned signal for any desired use and may be used specifically as an integral unit for reset function in a control apparatus.

This invention, therefore, provides a new and improved fluid amplifier device.

Other objects and advantages of this invention will be in part apparent and in part pointed out hereinafter and in the accompanying drawings, wherein:

FIGURE I is a schematic illustration of a simple structure according to this invention with a single sided approach; and FIGURE II is a schematic illustration of a double sided fluid amplifier according to this invention.

In the FIGURE I illustration, the power source is indicated at P providing fluid flow through passage 10 and then to an exhaust passage 11 with a branch passage 12 extending therefrom. An initial control input passage is indicated at 13 opening onto the main passage 10 for diverting flow from the main passage into the branch 12 in proportional accordance with the signal in the passage 13.

The fluid amplifier is proportional as indicated by the side wall exhaust recesses 10'. Excess fluid is exhausted by this means, and the wall recesses prevent bi-stable flip-flop wall holding action so that the central action is proportional.

From the branch 12 there is a feed back passage 14 leading to a feedback at 15 in a positive, aiding and additive relation with respect to the initial input signal in the passage 13. If desired, a resistance capacity combination as indicated at 16 and 17 in the feedback passage 14 may be provided as a feedback rate means whereby the unit will provide an integral or reset function.

The branch 12 continues through a restrictor 18 as passage for an output signal. This output signal may be as through the restrictor 18 to a sink or venting arrangement, or it may be dead ended in an operative unit such as a bellows. In either case the overall device will be operative.

The feedback arrangement through the passage 14 and in terms of the integral means of the variable resistance 16 and the capacity 17 is arranged to provide essentially one to one amplification. The feedback input in the input passage 15 is adjusted to maintain a predetermined output in the branch 12 in a lockup situation when the initial control signal in the passage 13 is removed. The signals in the passages 13 and 15 are additive so that the output in the branch 12 is one value when the initial signal in the passage 13 is applied, it is another value, greater, when the feedback in the passage 15 is added to the signal in the passage 13; and it is yet another, and final, holding value when the feedback is maintained and the initial signal removed. These various factors are calculated and predetermined to provide in the locked up hold over signal in the branch 12 that value which is desired and achieved after the various changes just described above.

The outlet to vent 11 is through a restrictor as indicated by opening 19 which operates in similar fashion to the restrictor 18 and the branch 12.

The FIGURE II illustration is a double-sided structure comparable to the one-sided structure of FIGURE I.

Like reference numbers are used on like elements to show their relationship to the structure of FIGURE 1. Where FIGURE I is one-sided, and FIGURE II is double, the second half of the FIGURE I device is indicated in primed reference numerals having similar functions to the elements having related unprimed numbers in FIGURES I and II.

Both of these systems in FIGURE I and FIGURE II are analog proportional systems with suitable wall setback and clearance to avoid bi-stable situations and with ventings provided in order to establish with the output restrictors suitable fluid situation flow through the entire pattern of the systems. Both systems also can be integral devices, with fluid resistance-capacity rate devices in the feedbacks as reset means.

This invention therefore provides a new and improved fluid amplifier analog system with memory which is usable in integral functions such as the reseting of controls.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. A fluid amplifier integral device comprising a main fluid input passage, two output passages branching from said main passage, a side wall exhaust setback and clearance recess in each of said output passages whereby ordinary bi-stable action is avoided in that no output passage wall section is provided for the fluid flow to cling to, a single central exhaust passage open to said main fluid input passage and located between said two output passages, a pair of initial signal passages as opposing control inputs to said device whereby fluid flow from said main flow input will be divided between said output passages according to the signal differential in said control input passages without flow lock-up in either of said output passages, a pair of feedback signal opposing control inputs to said device, crossover feedback passages from said output passages to said feedback control inputs, a series combination of fluid resistance and fluid capacity means in each of said crossover feedback passages, an output take-off passage from each of said crossover feedback passages, and fluid resistance means in each of said output take-off passages, whereby a feedback differential signal is applied to said device in the same proportion and direction as the initial signal differential, in such manner as to maintain the output differential as a memory of the initial signal differential.

References Cited

UNITED STATES PATENTS

| | | | |
|---|---|---|---|
| 3,024,805 | 3/1962 | Horton | 137—81.5 |
| 3,114,390 | 12/1963 | Glattli | 137—81.5 |
| 3,185,166 | 5/1965 | Horton | 137—81.5 |
| 3,223,101 | 12/1965 | Bowles | 137—81.5 |

FOREIGN PATENTS 1,278,781  11/1961  France.

M. CARY NELSON, *Primary Examiner.*

W. R. CLINE, *Assistant Examiner.*